(12) United States Patent
Wei et al.

(10) Patent No.: US 7,447,900 B2
(45) Date of Patent: Nov. 4, 2008

(54) METHOD AND A SYSTEM FOR DESIGNATING A USER SELECTED CONSOLE DEVICE AS THE PRIMARY CONSOLE DEVICE FOR A PARTICULAR COMPUTER

(75) Inventors: Dong Wei, Granite Bay, CA (US); Frederick G. Kleinsorge, Amherst, NH (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 807 days.

(21) Appl. No.: 10/942,171

(22) Filed: Sep. 15, 2004

(65) Prior Publication Data

US 2006/0059249 A1 Mar. 16, 2006

(51) Int. Cl.
*G06F 9/00* (2006.01)
*G06F 15/177* (2006.01)
(52) U.S. Cl. .................... 713/100; 713/1; 713/2

(58) Field of Classification Search ............ 713/100
See application file for complete search history.

(56) References Cited

U.S. PATENT DOCUMENTS

| 6,732,067 | B1* | 5/2004 | Powderly ............. 703/24 |
| 6,826,692 | B1* | 11/2004 | White ............. 726/8 |
| 7,117,353 | B2* | 10/2006 | Natu et al. ............. 713/2 |
| 7,287,099 | B1* | 10/2007 | Powderly et al. ............. 710/7 |
| 2003/0014526 | A1* | 1/2003 | Pullara et al. ............. 709/227 |
| 2005/0102429 | A1* | 5/2005 | Pinhas et al. ............. 709/248 |
| 2006/0047836 | A1* | 3/2006 | Rao et al. ............. 709/229 |

\* cited by examiner

*Primary Examiner*—Nitin C Patel

(57) ABSTRACT

Methods and systems for designating a user selected console device as the primary console device for a particular computer are provided. In one embodiment, information indicating which potential primary console device associated with a particular computer is the user selected console device is received. The user selected console device is designated as the primary console device for the particular computer.

20 Claims, 4 Drawing Sheets

METHOD AND A SYSTEM FOR DESIGNATING A USER SELECTED CONSOLE DEVICE AS THE PRIMARY CONSOLE DEVICE FOR A PARTICULAR COMPUTER

TECHNICAL FIELD

Embodiments of the present invention relate to the field of digital computing. More specifically, embodiments of the present invention relate to providing a way for a user to select a primary console device for a particular computer.

BACKGROUND ART

A primary console device enables a user, such as an administrator or other operator, to determine the operating status of a computer, such as a server, and to control the operations of the computer. For example, an administrator can use a primary console for a particular computer to log into the computer, while the computer is being booted, to logon to the computer without the license, or to cause the debugger that resides on the computer to execute. To increase profits, companies that produce operating systems can sell licenses that are required to logon onto the computer from the primary console.

Typically, multiple consoles, such as serial consoles, Video Graphics Array (VGA) consoles, Universal Graphics Adaptor (UGA) consoles, Local Area Network (LAN) consoles, etc., are associated with any given computer. FIG. 1 is a block diagram of a conventional system in which multiple console devices (also known as "console terminals") are associated with various computers in a network. For example, serial consoles 122, 132, 142 and VGA consoles 124, 134, 144 are associated with computers 120, 130, 140 executing different operating systems (also known as "platforms"). As depicted in FIG. 1, the computers 120, 130, 140 communicate with each other over network 110.

To login to any particular computer without a license or to cause the system debugger to execute, for example, the administrator needs to use the primary console device for the computer. This can be a confusing task since various computer platforms typically designate different console devices as the primary console device. This confusion has been dealt with in computers that execute the Windows™ operating system, such as window's computer 120, by designating all of the console devices 122, 124 associated with the Windows™ computers as primary console devices. For example, referring to FIG. 1, if a serial console 122 and a VGA console 124 is associated with a computer executing Windows™ 120, the window's computer 120 will designate both the serial console 122 and the VGA console 124 as consoles. Therefore, the administrator can, for example, use any console device 122, 124 associated with a computer 120 executing Windows™ to logon without a license.

In contrast, computers 130, 140 executing non-windows operating systems, such as Linux™, HP-UX™, and Open-VMS™, are implemented differently because the user community for these non-windows operating systems has indicated that they only want a single primary console device. Methods that vary from platform to platform have been developed to provide users a single primary console device to communicate with non-windows computers. For example, on one platform a VGA console may be designated as the primary console while on another platform a serial console may be designated as the primary console.

For example, a Linux™ computer 140 typically designates a VGA console 144 as the primary console device if a VGA console device is available. In contrast, a HP-UX computer 130 typically designates a serial console 132 as the primary console device if a serial console device 132 is available. This creates a confusing experience for users because they may think that one console device is the primary console device when in fact another console device is the primary console device. For example, they may try to logon to a Linux computer 140 using a serial console 142 when in fact VGA console device 144 is the primary console device or try to logon to an HP-UX computer 130 using a VGA console 134 when in fact serial console 132 is the primary console device.

Further, the fact that different platforms designate different console devices as the primary console device causes confusion for the people that manufacture the computers. For example, the manufacturing people must perform specific setup steps for different operating systems and for different platform types using a cumbersome menu interface.

A method and/or a system that eliminates the confusion for the users of computers in determining which console device is a primary console device would be valuable. A method and/or system that eliminates the confusion of the manufacturing people in determining how to configure computers would also be valuable. A method and/or system that eliminates the confusion of the user community and/or the manufacturing people but does not require existing operating systems to be changed would also be valuable.

DISCLOSURE OF THE INVENTION

Embodiments of the present invention pertain to methods and systems for designating a user selected console device as the primary console device for a particular computer are described. In one embodiment, information indicating which potential primary console device associated with a particular computer is the user selected console device is received. The user selected console device is designated as the primary console device for the particular computer.

BRIEF DESCRIPTION OF THE DRAWINGS

The accompanying drawings, which are incorporated in and form a part of this specification, illustrate embodiments of the invention and, together with the description, serve to explain the principles of the invention.

The drawings referred to in this description should not be understood as being drawn to scale except if specifically noted.

BEST MODE FOR CARRYING OUT THE INVENTION

Reference will now be made in detail to various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description of the present invention, numerous specific details are set forth in order to provide a thorough understanding of the present invention. In other instances, well-known methods, procedures, components, and circuits have not been described in detail as not to unnecessarily obscure aspects of the present invention.

System And Functional Overviews

Typically several console devices are associated with computers, such as servers. A user, such as an administrator, may want to designate a particular console device as the primary console device. This way the administrator has control over which console device is the primary console device. Since embodiments of the present invention allow the administrator to select the primary console device, the administrator will not be confused as to which console device is the primary console device. Further, manufacturing personnel do not need to be concerned with determining which operating system should be installed on any particular computer.

Figure 2:
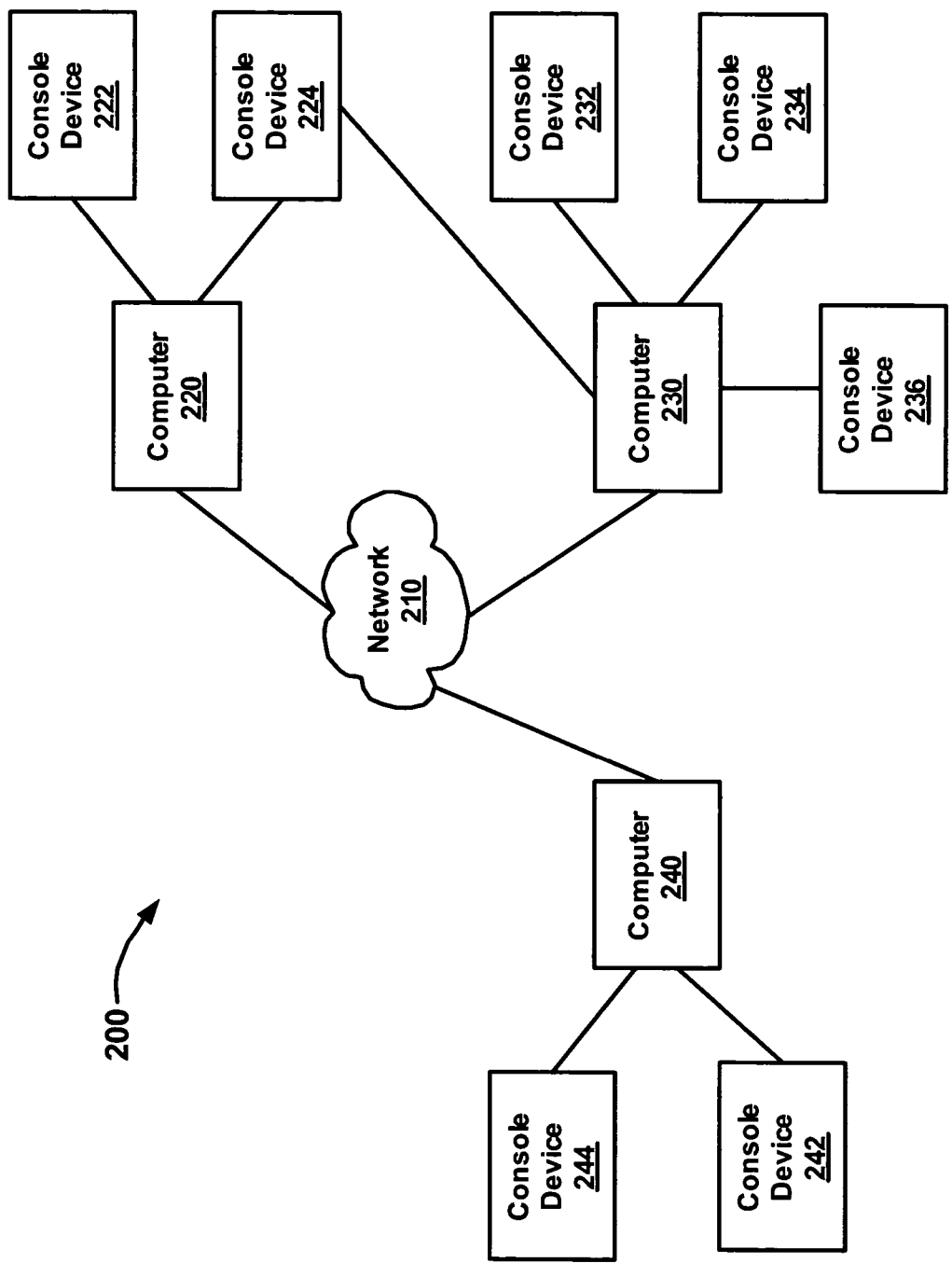
FIG. 2 is a block diagram of an exemplary system in which a user can select a primary console device for a particular computer, according to embodiments of the present invention.

According to one embodiment, the console devices associated with a particular computer are referred to as "potential primary console devices" from which an administrator can select a primary console device for that particular computer. FIG. 2 is a block diagram of an exemplary system in which a user can select a primary console device for a particular computer, according to embodiments of the present invention. The blocks in FIG. 2 can be arranged differently than as illustrated, and can implement additional or fewer features than what are described herein.

The system 200 includes a network 210, three computers 220, 230, 240 that communicate using the network 210, and potential primary console devices 222, 224, 232, 234, 236, 242, 244. Potential primary console devices 222, 224 are associated with computer 220, potential primary console devices 224, 232, 234, 236 are associated with computer 230, and potential primary console devices 242, 244 are associated with computer 240.

A user can designate which potential primary console device is the primary console device for a particular computer, according to one embodiment. For example, assume that an administrator wants to designate console device 224 as the primary console device. Computer 220 can list all of the potential primary console devices 222, 224, for example, using a generalized user interface (GUI), associated with computer 220. The administrator can use the GUI to select the potential primary console device 224 (referred to hereinafter as the "user selected console device") as the primary console device.

A particular potential primary console device may be designated as the primary console device for more than one computer, according to another embodiment. For example, assume that console device 224 is connected to computer 230 as well as computer 220. An administrator can use embodiments already described herein to designate console device 224 as the primary console device for computer 230. For example, by designating a primary console device that is common to many of the computers in a network, the job of an administrator can be simplified. More specifically, the administrator can go to one common primary console device to modify the configuration or to install software, for example, on the many computers in a network.

As a result of allowing a user to designate a particular potential primary console device as the primary console device addresses the fact that in conventional systems the type of console device that is designated as the primary console varies from platform to platform leading to a confusing user experience.

Figure 1:
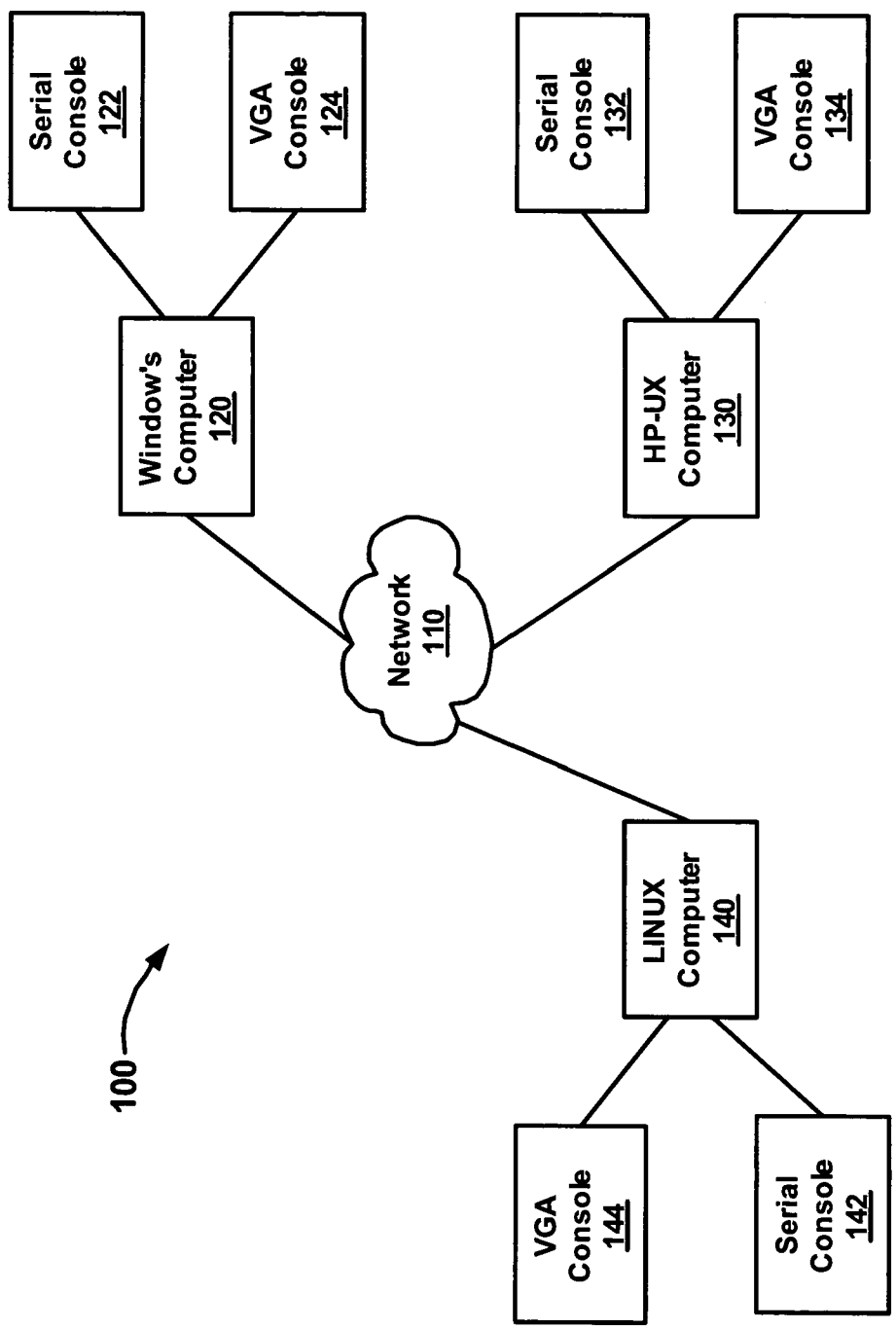
FIG. 1 is a block diagram of a conventional system in which multiple console devices are associated with various computers in a network.

For example, referring to FIG. 1, a Linux™ computer 140 typically designates a VGA console 144 as the primary console device if a VGA console device is available. In contrast, a HP-UX computer 130 typically designates a serial console 132 as the primary console device if a serial console device 132 is available. This creates a confusing experience for users because they may think that one console device is the primary console device when in fact another console device is the primary console device. For example, they may try to logon to a Linux computer 140 using a serial console 142 when in fact VGA console device 144 is the primary console device or try to logon to an HP-UX computer 130 using a VGA console 134 when in fact serial console 132 is the primary console device.

As a result of allowing a user to designate a particular potential primary console device as the primary console device addresses the fact that in conventional systems people that manufacture computers are confused as to how to setup computers. For example, in conventional systems the manufacturing people must perform specific setup steps for different operating systems and for different platform types using a cumbersome menu interface.

The Primary Console Device

A primary console device (also commonly known as a "primary console terminal") enables a user, such as an administrator or other operator, to determine the operating status of a computer, such as a server and to control the operations of the computer. For example, in some computing environments an administrator can use a primary console for a particular computer to log into the computer, while the computer is being booted, to logon to the computer without a license, or to cause the debugger that resides on the computer to execute. While the operating system executes (also known as "runtime"), the primary console device is often given special treatment, for example, allowing users to logon without a license or to cause the system debugger to be invoked from the primary console device.

The primary console device may be selected from various console devices (e.g., potential primary console devices) associated with a particular computer, according to one embodiment. For example, the potential primary console devices can be VGA consoles, serial consoles, LAN consoles, among other things. Serial consoles can be connected to a computer using a Universal Asynchronous Receiver Transmitter (UART) port, for example. Graphics cards are typically used in conjunction with VGA and UGA consoles. A Universal Serial Bus (USB) keyboard can be used, for example, in conjunction with a console device. Although such potential primary console devices are recited herein, embodiments of the present invention are also well suited for use with various other types of potential primary console devices.

Firmware

The firmware that is typically installed on many computers today is known as extensible firmware interface (EFI). EFI has logic to designate all console devices associated with the computers to be used as console devices. EFI designates the "console" as a collection of input, output and error devices (ConIn, ConOut, and ConErr). The multiple console devices associated with a computer are described in what is typically referred to as a "console device list." Further, there is a "console input list" (also commonly known as "ConInDev") that accepts inputs from certain console devices, a "console output list" (also commonly known as "ConOutDev") that accepts outputs from certain console devices, and a "console error list" (also commonly known as "ConErrDev") that accepts error messages from certain console devices. For example, each input device in the console input list accepts console input, and each device in the console output (and error) device list have all output written to each. So, for example, when the system starts, the output/error list might contain the graphics device, and the various UART ports. The input list might contain the USB keyboard, and the various UART ports. Firmware is commonly stored in System Read Only Memory (ROM).

Message Indicating That A Console Device Is Not The Primary Console Device

In the event that a user attempts to communicate with a particular computer from a console device that has not been designated as the primary console device, a message can be provided to the user indicating this fact, according to one embodiment. For example, assume that the user attempts to use console device 222 after the user has configured computer 220 to use console device 224 as the primary console device. The computer 220 can display a message on console device 222 indicating that console device 222 is not the primary console device. Further, according to another embodiment, the message can indicate that console device 224 is the primary console device.

Figure 3:
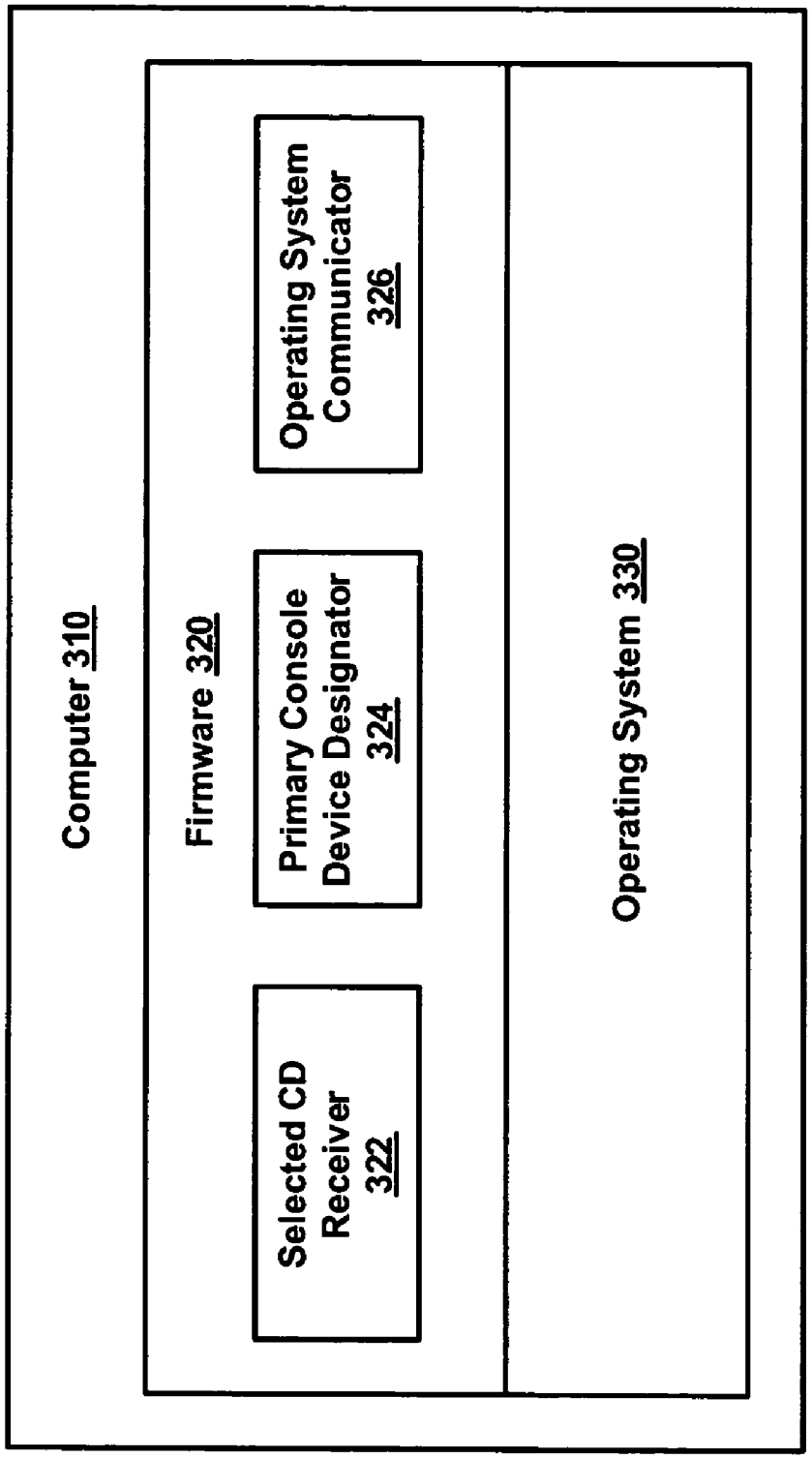
FIG. 3 depicts a particular computer in which a user can select a primary console device for the particular computer, according to embodiments of the present invention.

Computer System On Which A Particular Potential Primary Console Device Can Be Designated As The Primary Console Device FIG. 3 depicts a particular computer in which a user can select a primary console device for the particular computer, according to embodiments of the present invention. The blocks in FIG. 3 can be arranged differently than as illustrated, and can implement additional or fewer features than what are described herein. As depicted in FIG. 3, computer 310 includes firmware 320 and an operating system 330. The firmware 320 includes a selected console device receiver 322, a primary console device designator 324, and an optional operating system communicator 326. The operating system 330 is a non-windows operating system, according to one embodiment. For example, operating system 330 can be Linux™, HP-UX™ or OpenVMS™. According to another embodiment, operating system 330 is a Windows™ operating system.

For the following discussion in this section, assume that computer 220 is implemented as a computer 310. The selected console device receiver 322 receives information indicating which potential primary console device associated with a particular computer has been selected by an administrator. For example, the selected console device receiver 322 can receive information indicating that the administrator selected console device 224 as the primary console device.

The selected console device receiver 322 is a generalized user interface (GUI), according to one embodiment. Continuing the example, computer 310 can use the GUI to display the names of console device 222 and 224 on the screen of a default console device 222 for the administrator to see. The administrator may use the GUI to select one of the potential primary console devices (e.g., also referred to herein as "the user selected console device) as the primary console device. The GUI is a firmware user interface, according to another embodiment.

The selected console device receiver 322 is a configuration storage facility, according to yet another embodiment. For example, the administrator can enter information indicating that the administrator selected console device 224 as the primary console device into the configuration storage facility.

The computer 310 stores the information describing the potential primary console devices, according to one embodiment, and/or information indicating which potential primary console device is the user selected console device, according to another embodiment. Continuing the example, primary console device designator 324 or the selected console device receiver 322 can store information indicating that console devices 222 and 224 are the potential primary console devices for computer 310 and/or store information indicating that the administrator selected console device 224.

The primary console device designator 324, according to one embodiment, designates the user selected console device as the primary console device for a particular computer. Continuing the example, the primary console device designator 324 can designate console device 224 as the primary console device for computer 310.

The operating system communicator 326, according to one embodiment, communicates information describing the potential primary console devices to the operating system 330. According to another embodiment, the operating system communicator 326 communicates information describing the primary console device to the operating system 330. By communicating information describing the potential primary console devices and/or the primary console device to the operating system 330, the operating system 330 can allow users to logon without a license or to cause the system debugger to run from the primary console device 224, for example.

Continuing the example, the operating system communicator 326 can communicate that console devices 222 and 224 are potential primary console devices for computer 310 to operating system 330. Similarly, operating system communicator 326 can communicate to operating system 330 that console device 224 is the primary console device of computer 310.

According to another embodiment, selected control device receiver 322 and/or primary console device designator 324 reside in operating system 330 instead of firmware 320.

Structures For Storing Information

As already described, according to one embodiment, information describing the potential primary console device and/or the primary console device can be stored in structures described in tables 1-7 below. For the sake of simplicity, the potential primary console devices may be referred to as "console devices," or even as just "devices" in this section.

According to one embodiment, headless operations are used, as recommended by DIG64 (*Developer's Interface Guide for 64-bit Intel Architecture-based Servers*) v2.1.

Headless operations provide the basic support that enables comprehensive remote management.

One of the structures described in the "*Developer's Interface Guide for 64-bit Intel Architecture-based Servers*" is the Headless Console and Debug Port (HCDP) structure. According to one embodiment, the HCDP structure has been augmented to provide a Primary Console Device and Debug Port (PCDP) structure, the format for which is described in Table 4 below.

According to one embodiment, structures are created to store information for each potential primary console device associated with a computer. The structures are referred to herein as "entries." Information for each of the potential primary console device can be stored in a PCDP structure described by the PCDP Device Descriptor Template (refer to Table 4) which includes another structure known as a Device Specific Structure (refer to Tables 5, 6, 7), according to one embodiment. For example, the particular Device Specific Structure that is used to store information for any particular console device depends on the type of console device that it is. For example, in the event that a particular potential primary console device is a VGA console device, information for the VGA console device can be stored in a PCDP Structure (refer to Table 4) that includes a VGA Device Specific Structure (refer to Table 5). As already described herein.

As already described herein, EFI as implemented today provides a "console device list, "console input list," etc. The PCDP structure (refer to Table 4) with a device specific structure (refer to Tables 5, 6, 7) allows the firmware to communicate information about the potential primary console devices and/or the primary console device to the operating system, according to one embodiment. For example, the PCDP structure can provide device descriptions of the primary console device and/or the potential primary console devices that can be used by the operating system.

According to another embodiment, augmenting the HCDP structure to provide the PCDP structure allows existing operating systems which use the HCDP structure to continue to function without changes when, for example, non-UART devices are not described.

According to yet another embodiment, using a revision number of 3 or greater allows operating systems to determine if the entry is a PCDP structure or a traditional HCDP structure. The PCDP structure can, for example, provide descriptors for the primary device input and output devices (in the case of a single bi-direction device, this can be a single entry, for example). Optionally, the PCDP structure can also provide a descriptor to describe the location and characteristics of a Debug Port device, for example.

According to still another embodiment, the PCDP structure is a boot time static structure that complements the EFI device path description for the primary console debug port devices. For example, the direct use of the EFI UART device path as the console path can require the software to either use the standard PCI enumeration algorithm (if the UART device is a PCI device) or search the ACPI name space for the same UART object (if the UART device is a non-PCI device) to find the location of the serial port, the interrupt mode and the address translation information between the host side and the device side. According to one embodiment, the PCDP structure provides an index into the ConInDev and ConOutDev EFI variables to provide the connection to the EFI device path, which can be used by the operating system for runtime configuration of devices when using ACPI enumeration, for example. If the described device(s) are non-PCI devices, they can appear in the ACPI name space, according to one embodiment.

In the conventional art, the HCDP structure describes two entry types—Type 0 (UART Console) and Type 1 (Debug Port). Both of these entries describe simple UART devices and are fixed length entries of 48 bytes. According to one embodiment, these types are preserved, and according to another embodiment, additional entry types are provided to describe other types of devices. According to yet another embodiment, length information in a standard format is provided to allow code to process the entries.

Type 0 and type 1 entries, if they exist, are ordered first, according to one embodiment, allowing operating systems that can only process conventional HCDP structures to continue operating unchanged. The first Type 0 entries can be used as the preferred serial console for headless operations, according to one embodiment.

According to one embodiment, where a VGA graphics card and USB keyboard are used as the console, a PCDP descriptor specific to the VGA can be used. Further, one or more USB keyboards can be connected to the computer, for example.

According to one embodiment, entries are provided for any console device that might be used by an operating system during early boot. For example, all devices listed in the ConInDev and ConOutDev have entries.

According to another embodiment, non-Debug port devices are represented in the ConInDev or ConOutDev variables. Debug Port devices are typically not described in the EFI console variables or in the ACPI namespace, according to yet another embodiment. These devices are used, for example, for Kernel Debugging as a communication device to a second system from which the source level debug is done and are generally not seen by the operating system as a normal runtime device.

Conventional EFI provides a separately assignable error device. According to one embodiment, the PCDP structure does not attempt to connect "error" output devices that are not also listed in the ConOutDev. The operating system can, for example, obtain the ConErrDev information directly for runtime operation should there be a need for this.

The location and Globally Unique Identifier (GUID) pair for the PCDP structure, according to one embodiment, can be obtained from the EFI System Table (See the Extensible Firmware Interface Specification, at http://developer.intel.com/technology/efi/).

The GUID of the PCDP structure is defined as #define HCDP_TABLE_GUID/{0xF951938D, 0x620B, 0x42EF, 0X82, 0x79, 0xA8, 0x4B, 0x79, 0x61, 0x78, 0x98}

The PCDP structure depicted in Table 4 uses the standard "ACPI table header" as shown in table 1, according to one embodiment

TABLE 1

ACPI table header

| Field | Byte Length | Byte Offset | Description |
|---|---|---|---|
| Header | | | |
| Signature | 4 | 0 | 'HCDP'. Signature for the HCDP/PCDP Table. |
| Length | 4 | 4 | The length of the entire table, in bytes, including the header, starting from offset 0. |
| Revision | 1 | 8 | 3 |
| Checksum | 1 | 9 | The entire table, including the checksum field, must be add to 0 to be considered valid |

TABLE 1-continued

ACPI table header

| Field | Byte Length | Byte Offset | Description |
|---|---|---|---|
| OEMID | 6 | 10 | An OEM-supplied string that identifies the OEM |
| OEM Table ID | 8 | 16 | For HCDP/PCDP table, the table ID is the manufacturer model ID |
| OEM Revision | 4 | 24 | OEM revision of HCDP/PCDP table for the supplied OEM Table ID |
| Creator ID | 4 | 28 | Vendor ID of utility that created the table |
| Creator Revision | 4 | 32 | Revision of the utility that created the table |
| Number of Type 0 and Type 1 Entries | 4 | 36 | Number of Type 0 and Type 1 Entries. This is for compatibility with revision lower than 3 of this table. |
| Device Descriptor Entries | Varies | 40 | See Entry Type Definitions Below |

According to one embodiment, console and debug port devices are described using the device descriptors, (e.g., tables 2 and 3). For example, the first field of the device descriptor is the entry type that indicates what type of devices is described.

TABLE 2

Device Descriptor Entry Type Encoding

| Offset (in bits) | Description |
|---|---|
| 2:0 | 000 - bidirectional console<br>001 - debug port<br>010 - console output-only<br>011 - console input-only |
| 6:3 | Device Technologies:<br>0000 - UART<br>0001 - VGA<br>All other encodings are reserved. |

TABLE 2-continued

Device Descriptor Entry Type Encoding

| Offset (in bits) | Description |
|---|---|
| 7 | Vendor:<br>If this bit is clear, bits 6:0 are defined as above.<br>If this bit is set, bits 6:0 are defined by the vendor. This means that entry type 128 to 255 are vendor specific. The OS can check the OEMID in Table 1 to know the vendor before interpreting the Device Descriptor according to the definition provided by the OEM. |

According to one embodiment, using the above description, currently defined types are:

| Type Code | Description |
|---|---|
| 0 (0x00) | 0 0000 000 = Bidirectional Console UART |
| 1 (0x01) | 0 0000 001 = Bidirectional Debug Port UART |
| 10 (0x0A) | 0 0001 010 = VGA Console Output |

Type 0 and 1 descriptors use the backward compatible HCDP structure, according to one embodiment, and all other types can use the PCDP structure (refer to table 4), according to another embodiment.

According to one embodiment, all types except types 0 and 1, including vendor-specific types (bit 7 set codes 128-255), can provide the length of the descriptor in the two bytes (16 bits) at offset 2 in the entry. This, for example, allow code to skip any entry which it is not designed to process.

Table 3 describes the format for the UART device descriptor entry types. According to one embodiment, backward compatibility has been maintained with previous versions of the headless operation specification. For example, The UART device descriptor type described in Table 3 is different from the format for the device descriptor used for other devices (refer to table 3). The structure described by Table 3 provides a byte at offset 41 for indicating that structure provides information about the primary console, according to embodiment.

TABLE 3

UART Device Descriptor type

| Offset (in bytes) | Length (in bytes) | Description |
|---|---|---|
| 0 | 1 | Entry type denoting UART Device Descriptor type based on the definition in Table 2, for example,<br>00000000 - UART bidirectional console<br>00000001 - UART debug port |
| 1 | 1 | Data Bits: the number of data bits for the UART. |
| 2 | 1 | Parity: The parity setting for the UART.<br>0x01 - No Parity<br>0x02 - Even Parity<br>0x03 - Odd Parity<br>0x04 - Mark Parity<br>0x05 - Space Parity<br>Other values are reserved |
| 3 | 1 | Stop Bits: The number of stop bits for the UART.<br>0x01 - 1 Stop Bit<br>0x02 - 1.5 Stop Bits<br>0x03 - 2 Stop Bits<br>Other values are reserved |

TABLE 3-continued

UART Device Descriptor type

| Offset (in bytes) | Length (in bytes) | Description |
|---|---|---|
| 4 | 1 | PCI Segment Group Number or ACPI _UID[7:0] depending on the setting of bit 7 at Offset 41 |
| 5 | 1 | PCI Bus Number or ACPI _UID[15:8] depending on the setting of bit 7 at Offset 41 |
| 6 | 1 | Bit 4:0 - PCI Device Number, Bit 7:5 - Reserved (0 according to one embodiment, according to one embodiment)<br>Or ACPI _UID[23:16] depending on the setting of bit 7 at Offset 41 |
| 7 | 1 | Bit 2:0 - PCI Function Number, Bit 5:3 - Reserved (0 according to one embodiment, according to one embodiment), Bit 7:6 - Ignored.<br>Or ACPI _UID[31:24] depending on the setting of bit 7 at Offset 41 |
| 8 | 8 | Baud Rate: The baud rate setting for the UART style device. |
| 16 | 12 | Base Address: Use the ACPI GAS (Generic Address Structure) to describe the base address of the UART Device. For backward compatibility reasons, this address is the Host Side address in the case of MMIO, according to one embodiment, and it is the Host Side IO port address in the case of IO Port, according to another embodiment. |
| 28 | 2 | Device ID - Follow the PCI Specification if the UART device is a PCI device.<br>Or ACPI _HID[15:0] depending on the setting of bit 7 at Offset 41 |
| 30 | 2 | Vendor ID - Follow the PCI Specification if the UART device is a PCI device.<br>Or ACPI _HID[31:16] depending on the setting of bit 7 at Offset 41<br>For a non-PCI UART device, the Device ID and Vendor ID fields combined is the ACPI _HID value (following the ACPI format). If _HID is 0xaabbccdd, offset 28 contains 0xdd, offset 29 contains 0xcc, offset 30 contains 0xbb and offset 31 contains 0xaa. |
| 32 | 4 | ACPI Global System Interrupt used by this UART device, if Interrupt Flag is set, according to one embodiment. Otherwise this field is 0, according to another embodiment. |
| 36 | 4 | Pseudo Clock Rate. Clock Divisor = Baud Rate/Pseudo Clock Rate. On a standard system, the Pseudo Clock Rate is 115200, for a baud rate of 115200, the Clock Divisor programmed is 1 (which is what is programmed into the UART register). |
| 40 | 1 | Interface byte of the PCI Class Codes (Base Class 07h, Sub Class 00h assumed), refer to PCI Local Bus Specification v2.2. |
| 41 | 1 | Bit 7 - PCI Device Flag. For PCI UART devices, this bit is set. For non-PCI devices, this bit is cleared. When this bit is cleared, byte 4–7 contain the ACPI _UID value. If _UID is 0xaabbccdd, offset 4 contains 0xdd, offset 5 contains 0xcc, offset 6 contains 0xbb and offset 7 contains 0xaa.<br>Bit 6 - Interrupt Flag: 0-interrupt not supported, 1-interrupt supported<br>Bit[5:3] Reserved (0 according to one embodiment)<br>Bit[2] Primary Console<br>0-Not the Primary Console<br>1-Primary Console<br>Bit[1] Interrupt Polarity,<br>0-Active-High: This interrupt is sampled when the signal is high, or true.<br>1-Active-Low: This interrupt is sampled when the signal is low, or false.<br>Bit[0] Interrupt Mode,<br>0-Level-Triggered: This interrupt is triggered in response to the signal being in either a high or low state.<br>1-Edge-Triggered: This interrupt is triggered in response to a change in signal state, either high to low or low to high.<br>PCI devices are always level triggered and active low, so these two bits are set to 10b for PCI devices. |
| 42 | 2 | Index (0-based) into the EFI ConOutDev Variable.<br>Bidirectional ports always index into the ConOutDev Variable.<br>Value of 0xFFFF indicates the system is not supporting EFI. |
| 44 | 4 | Reserved (0 according to one embodiment). |

According to one embodiment, the "0 means default" values from the data bits, parity, stop bits, pseudo clock rate and baud rate fields are removed in the definition for the PCDP table with its revision level 3 or higher because firmware can report the right value. Previous revisions of the table can still present the value 0, according to another embodiment. The operating system can handle this case accordingly.

For new device descriptors (i.e., non-UART device descriptors), a PCDP structure is described by the PCDP Device Descriptor Template depicted in table 4 below, according to one embodiment. The PCDP structure provides a byte at offset 1 for indicating that the PCDP structure provides information about the primary console, according to one embodiment.

TABLE 4

PCDP Device Descriptor Template

| Offset (in bytes) | Length (in bytes) | Description |
|---|---|---|
| 0 | 1 | Entry type as defined in Table 2. |
| 1 | 1 | Bit [7:1] - Reserved (0 according to one embodiment)<br>Bit[0]: Primary Console<br>0-Not the primary console device<br>1-Primary console device |
| 2 | 2 | Length of the Device Descriptor (in bytes) |
| 4 | 2 | Index (0-based) into the EFI ConInDev/ConOutDev Variable.<br>Bits [2:0] of the entry type (offset 0) determine which variable is indexed:<br>000 ConOutDev<br>001 NOT VALID<br>010 ConOutDev<br>011 ConInDev<br>A value of 0xFFFF indicates that the system does not support EFI. |
| 6 | — | Interconnect Specific Structure(s). |
| — | — | Device Specific Structure |

Tables 5 through 7 describe various types of "device specific structures," and "interconnect specific structures," according to one embodiment. For example, Table 5 describes the VGA Device Specific Structure. Tables 6 and 7 describe Interconnect Specific Structures. Table 6 describes the Advanced Configuration and Power Interface (ACPI) Specific Structure. Table 7 describes the Peripheral Component Interconnect (PCI) Specific Structure.

TABLE 5

VGA Device Specific Structure

| Offset (in bytes) | Length (in bytes) | Description |
|---|---|---|
| 0 | 1 | Number of Extended Address Space Descriptors (as defined in ACPI 3.0) describing the resources of the VGA device. |
| 1 | 56 | 1$^{st}$ Extended Address Space Descriptor |
| 57 | — | Additional Address Space Descriptors |

TABLE 6

ACPI Specific Structure

| Offset (in bytes) | Length (in bytes) | Description |
|---|---|---|
| 0 | 1 | Interconnect Type = 0 indicating ACPI |
| 1 | 1 | Reserved (0 according to one embodiment) |
| 2 | 2 | Length of the ACPI Specific Structure |
| 4 | 1 | ACPI _UID[7:0] |
| 5 | 1 | ACPI _UID[15:8]. |
| 6 | 1 | ACPI _UID[23:16] |
| 7 | 1 | ACPI _UID[31:24] |
| 8 | 2 | ACPI _HID[15:0] |
| 10 | 2 | ACPI _HID[31:16]<br>If _HID is 0xaabbccdd, offset 8 contains 0xdd, offset 9 contains 0xcc, offset 10 contains 0xbb and offset 11 contains 0xaa. If the _HID is a string, the OS can use the EFI Device Path to get the _HID, according to one embodiment. |
| 12 | 4 | ACPI Global System Interrupt used by this device, if Interrupt Flag is set, according to one embodiment. Otherwise this field is 0, according to another embodiment. |
| 16 | 8 | MMIO _TRA: this is the offset that can be added to the address on the device side to obtain the address on the host side. Since the _TRA usage in the ACPI name space is associated with each bridge, there is only one entry in the table, so this field reflects the accumulation of all the _TRA info in the ACPI name space from the Host Side to the Device Side. |
| 24 | 8 | IO Port _TRA: this is the offset that can be added to the address on the device side to obtain the address on the host side. Since the _TRA usage in the ACPI name space is associated with each bridge, there is only one entry in the table, so this field reflects the accumulation of all the _TRA info in the ACPI name space from the Host Side to the Device Side. This can be used together with bit 4-3 (_TTP and _TRS) in byte offset 32. |
| 32 | 1 | Bitr[7] - Reserved (0 according to one embodiment)<br>Bit[6] - Interrupt Flag: 0-interrupt not supported, 1-interrupt supported<br>Bit[5] - Reserved (0 according to one embodiment)<br>Bit[4]: Memory to I/O Translation, _TTP<br>1-TypeTranslation: This resource, which is memory on the device side, is I/O on the host side of the bridge.<br>0-TypeStatic: This resource, which is memory on the device side, is also memory on the host side.<br>Bit[3]: Sparse Translation, _TRS. This bit is only meaningful if _TTP is set.<br>1-SparseTranslation: The host-side memory address of any specific I/O port within the device-side range can be found using the following function.<br>address = (((port & 0xfffc) << 10) || (port & 0xfff) + _TRA<br>In the address used to access the I/O port, bits[11:2] is identical to bits[21:12], according to one embodiment, this gives four bytes of I/O ports on each 4 KB page.<br>0-DenseTranslation: The host-side memory address of any specific I/O |

TABLE 6-continued

ACPI Specific Structure

| Offset (in bytes) | Length (in bytes) | Description |
|---|---|---|
| | | port within the device-side range can be found using the following function.<br>address = port + _TRA<br>Note: Bit[4:3] are only valid for describing the IO port translations, if used in the system.<br>Bit[2] Reserved (0 according to one embodiment)<br>Bit[1] Interrupt Polarity,<br>0-Active-High: This interrupt is sampled when the signal is high, or true.<br>1-Active-Low: This interrupt is sampled when the signal is low, or false.<br>Bit[0] Interrupt Mode,<br>0-Level-Triggered: This interrupt is triggered in response to the signal being in either a high or low state.<br>1-Edge-Triggered: This interrupt is triggered in response to a change in signal state, either high to low or low to high. |
| 33 | 1 | Translation Fields Validation Bits:<br>Bit [7:2]: Reserved (0 according to one embodiment)<br>Bit [1] = IO Port _TRA Valid<br>Bit [0] = MMIO _TRA valid<br>Bits [2:0] = 000b indicates identity mapping. |

TABLE 7

PCI Specific Structure

| Offset (in bytes) | Length (in bytes) | Description |
|---|---|---|
| 0 | 1 | Interconnect Type = 1 indicating PCI |
| 1 | 1 | Reserved (0 according to one embodiment) |
| 2 | 2 | Length of the PCI Specific Structure |
| 4 | 1 | PCI Segment GroupNumber |
| 5 | 1 | PCI Bus Number |
| 6 | 1 | Bit 4:0 - PCI Device Number, Bit 7:5 - Reserved (0 according to one embodiment) |
| 7 | 1 | Bit 2:0 - PCI Function Number, Bit 7:3 - Reserved (0 according to one embodiment) |
| 8 | 2 | Device ID - Follow the PCI Specification for PCI |
| 10 | 2 | Vendor ID - Follow the PCI Specification for PCI, |
| 12 | 4 | ACPI Global System Interrupt used by this device, if Interrupt Flag is set. Otherwise this field 0 according to one embodiment. |
| 16 | 8 | MMIO _TRA: this is the offset that can be added to the address on the device side to obtain the address on the host side. Since the _TRA usage in the ACPI name space is associated with each bridge, there is only one entry in the table, so this field reflects the accumulation of all the _TRA info in the ACPI name space from the Host Side to the Device Side. |
| 24 | 8 | IO Port _TRA: this is the offset that can be added to the address on the device side to obtain the address on the host side. Since the _TRA usage in the ACPI name space is associated with each bridge, there is only one entry in the table, so this field reflects the accumulation of all the _TRA info in the ACPI name space from the Host Side to the Device Side. This can be used together with bit 4-3 (_TTP and _TRS) in byte offset 32. |
| 32 | 1 | Bit[7] - Reserved (0 according to one embodiment)<br>Bit[6] - Interrupt Flag: 0-interrupt not supported, 1-interrupt supported<br>Bit[5] - Reserved (0 according to one embodiment)<br>Bit[4]: Memory to I/O Translation _TTP<br>1-TypeTranslation: This resource, which is memory on the device side, is I/O on the host side of the bridge.<br>0-TypeStatic: This resource, which is memory on the device side, is also memory on the host side.<br>Bit[3]: Sparse Translation, _TRS. This bit is only meaningful if _TTP is set.<br>1-SparseTranslation: The host-side memory address of any specific I/O port within the device-side range can be found using the following function.<br>address = (((port & 0xfffc) << 10) || (port & 0xfff)) + _TRA<br>In the address used to access the I/O port, bits[11:2] can, according to one embodiment, be identical to bits[21:12], this gives four bytes of I/O ports on each 4 KB page.<br>0-DenseTranslation: The host-side memory address of any specific I/O |

TABLE 7-continued

PCI Specific Structure

| Offset (in bytes) | Length (in bytes) | Description |
|---|---|---|
| | | port within the device-side range can be found using the following function.<br>address = port + _TRA<br>Note: Bit[4:3] are only valid for describing the IO port translations, if used in the system.<br>Bit[2] Reserved (0 according to one embodiment)<br>Bit[1:0]value = 10b (PCI supports Active-Low Level-Triggering interrupt) |
| 33 | 1 | Translation Fields Validation Bits:<br>Bit [7:2]: Reserved (0 according to one embodiment)<br>Bit [1] = IO Port _TRA Valid<br>Bit [0] = MMIO _TRA valid<br>Bits [2:0] = 000b indicates identity mapping. |

Operational Example

Figure 4:
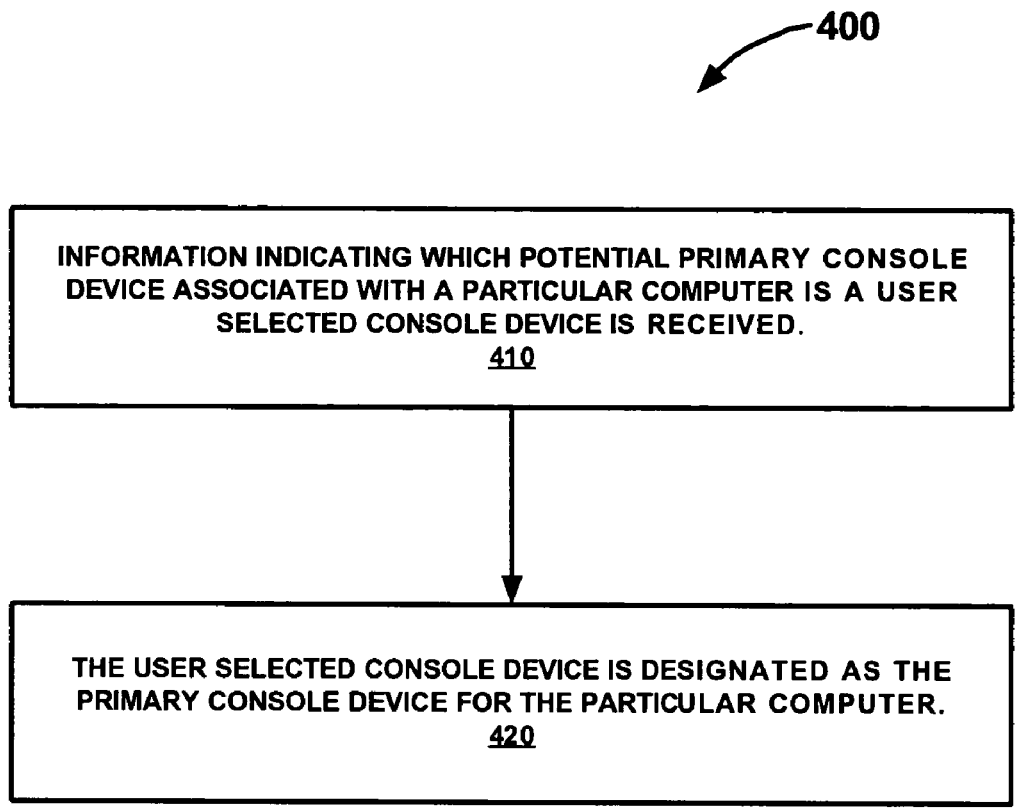
FIG. 4 depicts a flowchart for a method that allows a user to select a primary console device for a particular computer, according to embodiments of the present invention.

FIG. 4 depicts a flowchart 400 for a method that allows a user to select a primary console device for a particular computer, according to embodiments of the present invention. Although specific steps are disclosed in flowchart 400, such steps are exemplary. That is, embodiments of the present invention are well suited to performing various other steps or variations of the steps recited in flowchart 400. It is appreciated that the steps in flowchart 400 may be performed in an order different than presented, and that not all of the steps in flowchart 400 may be performed. All of, or a portion of, the embodiments described by flowchart 400 can be implemented using computer-readable and computer-executable instructions which reside, for example, in computer-usable media of a computer system or like device.

For the purposes of illustration, the discussion of flowchart 400 shall refer to FIGS. 2 and 3, shall assume that the implementation of computer 310 (FIG. 3) is used for computer 220 and that console device 222 is currently the default console device and that a user, such as an administrator, wants to designate console device 224 as the primary console device for computer 220.

To prepare for steps 410 and 420, certain operations can be performed, according to one embodiment. For example, firmware, such as firmware 320, and an operating system, such as operating system 330, can be installed on computer 220. Computer 220 can be booted up resulting in the execution of instructions associated first with the firmware 320 and later instructions associated with the operating system 330, for example.

In step 410, information indicating which potential primary console device associated with a particular computer is a user selected console device is received, according to one embodiment. For example, the firmware 320 can display a list of the potential primary console devices 222, 224 associated with computer 220 to the administrator using a firmware user interface on the default console device, for example. A management process (MP) could have been used to specify the default console. The administrator uses the firmware user interface to select console device 224 from the list as the primary console device. The selected console device receiver 322 receives information indicating that the user selected console device 224 (also referred to as the "user selected console device") is the primary console device.

In step 420, the user selected console device is designated as the primary console device for the particular computer, according to one embodiment. For example, the primary console device designator 324 designates console device 224 as the primary console device of computer 220.

Either the selected console device receiver 322 or the primary console device designator 324 can, for example, store information indicating that the console devices 222, 224 are potential primary console devices for computer 220 and/or store information indicating that console device 224 has been selected as the primary console device in one or more structures described by tables 4-7 as already described herein. The operating system communicator 326 can, for example, communicate the information stored in the structures to the operating system 330.

In the above operational example, a default console device was used initially to display a list of the potential primary console devices, according to one embodiment. Alternatively, the current primary console device could be used instead, according to another embodiment. For example, if console device 222 had been the current primary console device, the list of potential primary console devices could have been displayed on console device 222.

CONCLUSION

By providing a user with a way to designate a particular console device as the primary console device eliminates the confusion of the users of computers, eliminates the need for manufacturing people to pre-configure computers. By enhancing the HCDP structure in a backwards compatible manner, for example, by using version codes, among other things, allows embodiments of the present invention to be backwards compatible with conventional operating systems.

What is claimed is:

1. A method of designating a user selected console device as the primary console device for a particular computer, the method comprising:

receiving information indicating which potential primary console device associated with a particular computer is the user selected console device for the particular computer; and designating the user selected console device as the primary console device for the particular computer.

2. The method as recited in claim 1, wherein the method further comprises:

storing information describing the potential primary console devices in one or more structures selected from the group consisting of a PCDP structure and a device specific structure.

3. The method as recited in claim 1, wherein the method further comprises:

storing the information indicating which potential primary console device is the user selected console device in one or more structures selected from the group consisting of a PCDP structure and a device specific structure.

4. The method as recited in claim 1, wherein the method further comprises:
communicating the information describing the potential primary console devices and the primary console device to an operating system associated with the particular computer.

5. The method as recited in claim 1, the user attempts to communicate with the particular computer from a particular console device that has not been designated as the primary console device and wherein the method further comprises:
providing a message on the particular console device the user is, wherein the message indicates that the particular console device is not the primary console device.

6. The method as recited in claim 5, wherein the message provides information describing the primary console device.

7. The method as recited in claim 1, wherein a non-windows operating system resides on the particular computer.

8. The method as recited in claim 1, wherein the non-windows operating system is selected from a group consisting of Linux™, HP-UX™, and OpenVMS™.

9. A computer system comprising:
a selected console device receiver for receiving information indicating which potential primary console device associated with a particular computer is a user selected console device for the particular computer; and
a primary console device designator for designating the user selected console device as the primary console device for the particular computer.

10. The computer system of claim 9, wherein the computer system is a first computer system and wherein the primary console device for the first computer system is designated as the primary console device for a second computer system.

11. The computer system of claim 9, wherein firmware and an operating system are associated with the computer system and wherein the user selected console device receiver and the primary console device designator are associated with the firmware.

12. The computer system of claim 11, wherein the computer system further comprises an operating system communicator, and wherein the operating system communicator communicates information describing the potential primary console devices to an operating system associated with on the particular computer.

13. The computer system of claim 9, wherein the selected console device receiver is a generalized user interface (GUI), and wherein the GUI provides a list of the potential primary console devices to the user and receives the information indicating which potential primary console device is the user selected console device.

14. The computer system of claim 9, wherein the selected console device receiver is a configuration storage facility, and wherein the user enters the information indicating which potential primary console device is the user selected console device into the configuration storage facility and the selected console device receiver receives the information from the configuration storage facility.

15. A computer-readable storage medium having computer-readable program code embodied therein for causing a computer system to perform a method of allowing a user to select a primary console device for a particular computer, the method comprising:
receiving information indicating which potential primary console device associated with the computer system is selected by a user as a primary console device for the computer system; and
storing information designating the selected potential primary console device as the primary console device for the computer system.

16. The computer-readable storage medium of claim 15, wherein the computer-readable program code embodied therein causes a computer system to perform the method, and wherein the method further comprises:
storing information describing the potential primary console devices and the primary console device in one or more structures selected from the group consisting of a PCDP structure and a device specific structure.

17. The computer-readable storage medium of claim 15, wherein the computer-readable program code embodied therein causes a computer system to perform the method, and wherein the method further comprises:
communicating the information describing the potential primary console devices and the primary console device to an operating system associated with the particular computer.

18. The computer-readable storage medium of claim 15, wherein the computer-readable program code embodied therein causes a computer system to perform the method, and wherein the user attempts to communicate with the particular computer from a particular console device that has not been designated as the primary console device and wherein the method further comprises:
providing a message on the particular console device the user is, wherein the message indicates that the particular console device is not the primary console device.

19. The computer-readable storage medium of claim 18, wherein the computer-readable program code embodied therein causes a computer system to perform the method, and wherein the message provides information describing the primary console device.

20. The computer-readable storage medium of claim 15, wherein the computer-readable program code embodied therein causes a computer system to perform the method, and wherein a non-windows operating system resides on the particular computer.

* * * * *

UNITED STATES PATENT AND TRADEMARK OFFICE
CERTIFICATE OF CORRECTION

PATENT NO. : 7,447,900 B2 Page 1 of 1
APPLICATION NO. : 10/942171
DATED : November 4, 2008
INVENTOR(S) : Dong Wei et al.

It is certified that error appears in the above-identified patent and that said Letters Patent is hereby corrected as shown below:

In column 10, line 32, after "example," insert -- can --.

In column 10, line 41, after "that" insert -- the --.

In column 10, line 42, after "according to" insert -- one --.

In column 14, in Table 6, line 30, delete "Bitr[7]" and insert -- Bit[7] --, therefor.

Signed and Sealed this

Thirty-first Day of March, 2009

JOHN DOLL
*Acting Director of the United States Patent and Trademark Office*